United States Patent
Silfverberg et al.

(10) Patent No.: US 7,827,142 B2
(45) Date of Patent: Nov. 2, 2010

(54) DATA ELEMENT INFORMATION MANAGEMENT IN A NETWORK ENVIRONMENT

(75) Inventors: Kari Silfverberg, Mouhijärvi (FI); Timo Aaltonen, Tampere (FI); Anna-Maija Havela, Julkujärvi (FI); Keijo Ekola, Tampere (FI)

(73) Assignee: Nokia Corporation, Espoo (FI)

( * ) Notice: Subject to any disclaimer, the term of this patent is extended or adjusted under 35 U.S.C. 154(b) by 225 days.

(21) Appl. No.: 10/477,321

(22) PCT Filed: May 11, 2001

(86) PCT No.: PCT/EP01/05432

§ 371 (c)(1),
(2), (4) Date: Dec. 5, 2003

(87) PCT Pub. No.: WO02/093963

PCT Pub. Date: Nov. 21, 2002

(65) Prior Publication Data

US 2004/0236783 A1    Nov. 25, 2004

(51) Int. Cl.
*G06F 17/00* (2006.01)
(52) U.S. Cl. .................................. 707/626
(58) Field of Classification Search ............. 707/610, 707/612, 614, 626, 630
See application file for complete search history.

(56) References Cited

U.S. PATENT DOCUMENTS

| | | | |
|---|---|---|---|
| 5,423,037 A | 6/1995 | Hvasshovd | |
| 5,721,905 A | 2/1998 | Elixmann et al. | |
| 5,806,074 A * | 9/1998 | Souder et al. | 1/1 |

(Continued)

FOREIGN PATENT DOCUMENTS

EP    0 702 496 A2    3/1996

(Continued)

OTHER PUBLICATIONS

Database Replication in Microsoft Jet 4.0. A Microsoft Access 2000 Technical Article by Debra Dove. Jan. 1999. http://msdn.microsoft.com/en-us/library/aa140024%28office.10%29.aspx.*

(Continued)

*Primary Examiner*—Robert Timblin
(74) *Attorney, Agent, or Firm*—Harrington & Smith

(57) ABSTRACT

The present invention proposes a method for data element information management in a network environment, the network environment comprising a plurality of data element information entities (5a, 5b, 5c, 5d), each keeping a respective record of data element information for a plurality of subscribers, and a request routing entity (3), adapted to route (4, S2) requests to a selected one of said plurality of database entities, the method comprising the steps of transmitting (S1) a data element information update for a specific subscriber to said routing entity (3), selecting, at said request routing entity (3), one (5b) of said plurality of database entities for said specific subscriber, forwarding (S2) said data element information update to said selected database entity (5b), and relaying (S5) said data element information update from said selected database entity (5a) to another database entity (5d) of said plurality of database entities. Also, the present invention concerns a request routing entity and a database entity, adapted to mutually cooperate with each other in order to perform the method according to the present invention.

5 Claims, 4 Drawing Sheets

U.S. PATENT DOCUMENTS

| | | | |
|---|---|---|---|
| 6,199,074 B1 * | 3/2001 | Kern et al. | 707/204 |
| 6,209,002 B1 * | 3/2001 | Gagne et al. | 707/204 |
| 6,243,715 B1 * | 6/2001 | Bogantz et al. | 707/201 |
| 6,499,037 B1 * | 12/2002 | Breitbart et al. | 707/103 R |
| 6,601,076 B1 * | 7/2003 | McCaw et al. | 1/1 |

FOREIGN PATENT DOCUMENTS

| WO | WO 97/39413 | * 10/1997 |
|---|---|---|
| WO | WO 99/35867 | 7/1999 |

OTHER PUBLICATIONS

"Data Management for Wide-Area Mobility in Private Telecommunications Networks", Maass et al, ITG Fachberichte, Sep. 1, 1993, pp. 535-546, XP000562985.

* cited by examiner

| Subscriber | Primary HSS | Secondary HSS |
|---|---|---|
| USIM 1 | HSS_N2 | HSS_N4 |
| USIM 2 | HSS_N2 | HSS_N4 |
| USIM 3 | HSS_N1 | HSS_N3 |
| .... | .... | .... |

DATABASE ALLOCATION TABLE AT SRS

DATA ELEMENT INFORMATION MANAGEMENT IN A NETWORK ENVIRONMENT

FIELD OF THE INVENTION

The present invention relates to a method for data element information management in a network environment.

BACKGROUND OF THE INVENTION

It is to be noted that under the term "network environment" in the sense as used in connection with the description of the present invention there is to be understood for example a communication network system, a network environment for an organization, a network environment for a plant, or the like.

However, for descriptive purposes which are by no means intended to be limiting the present invention, a communication network system has been chosen as an example for illustrating the present invention.

In connection with the thus chosen example, the expression "data element" is associated to a subscriber to said communication network, i.e. data element information mean subscriber related information. Nevertheless, this is not limiting and in other network environments, data elements may be associated suitable other information such as employee information in a network environment for an organization, or product information in a network environment for a plant.

In connection with the thus chosen example, the expression "request routing" is associated to a signaling within said communication network. Nevertheless, this is not limiting and in other network environments, to the term request routing may be associated a suitable other meaning than signaling.

In the recent years, communication networks have become more and more popular and accepted by a continuously increasing number of communication network subscribers. In order that such communication networks function properly, subscriber data have to be kept in the network and made available to network entities involved in establishing communication to and/or from a respective subscriber and his communication partner. Conventionally, such subscriber data are maintained in a so-called home location register HLR in case a GSM network is concerned (GSM=Global Standard of Mobile Communication).

With the progress in communication networks and the development of the so-called third generation (3G) networks also referred to as UMTS network (Universal Mobile Telecommunication System) the functionality previously implemented into the home location register HLR has been transferred to a so-called home subscriber server HSS functional entity. The home subscriber server HSS is the master database for a given user (subscriber). It is the entity containing the subscription related information to support the network entities actually handling calls/sessions in which the user is involved.

For example, the home subscriber server HSS could provide support to the call control servers in order to complete the routing/roaming procedures by solving authentication, authorization, naming/addressing resolution, location dependencies and so on.

In particular, the home subscriber server HSS is responsible for holding the following user related information:

user identification, numbering and addressing information
user security information: network access control information for authentication and authorization
user location information at intersystem level; HSS handles the user registration and stores inter-system location information and so on
the user profile (services, service specific information . . . )

Based on the information held in the home subscriber server, the home subscriber is also responsible for supporting call control (CC) and/or subscriber management (SM) entities of different control systems (circuit switched domain control, packet switched domain control, IP multimedia control) offered by the operator.

The above mentioned third generation communication networks rely on the Internet Protocol (IP). Nevertheless, the present invention as to be described hereinafter is not limited to third generation communication networks and/or on communication networks making use of the Internet Protocol.

Rather, the third generation network operated on the basis of the Internet Protocol is chosen as an illustrative example only. In particular, the present invention is applicable to all communication networks in which subscriber related information is kept in a plurality of subscriber information database entities.

With the increase in the number of subscribers to a network and also with the increase of the networks and network complexity, the likelihood of a failure of either a network entity and/or an interface between network entities is likely to increase. In order to assure a continuous operation for a communication network even in case of a failure situation occurring somewhere within the network, the subscriber data have to be held available all the time.

Previously, providing a copy of the subscriber database was one approach. Such a copy (also known as back-up) of the database was established for example after regular intervals. However, during the time required for backing-up it is at least difficult to provide the full performance of the communication network. Still further, new subscriber data and/or changed subscriber data are not kept track-off unless a backup of the subscriber database entity is performed. Thus, if a database entity brakes down after the recent backup and before a subsequent backup, new and/or amended data contained in the database entity are difficult to be restored on the basis of only the backup database.

SUMMARY OF THE INVENTION

Hence, it is an object of the present invention to provide an improved method for data element information management in a network environment, which is free from the above mentioned drawbacks.

According to the present invention, this object is for example achieved by a method for data element information management in a network environment, the network environment comprising a plurality of data element information database entities, each keeping a respective record of data element information for a plurality of data elements, and a request routing entity, adapted to route requests to a selected one of said plurality of database entities, the method comprising the steps of transmitting a data element information update for a specific data element to said request routing entity, selecting, at said request routing entity, one of said plurality of database entities for said specific data element, forwarding said data element information update to said selected database entity, and relaying said data element information update from said selected database entity to at least another database entity of said plurality of database entities.

According to further developments of the present invention, said data element information comprises information related to a subscriber of a communication network;

said database entities are home subscriber server, HSS, entities;

said request routing entity comprises a table defining an allocation of at least two of said plurality of database entities to a specific data element, and selecting is performed according to the entries to said table;

a priority is assigned to each of said allocated database entities in said table, and selecting is performed according to the highest priority;

a respective different priority is assigned to each allocated database entity;

said request routing entity comprises a table defining an allocation of at least two of said plurality of database entities to a specific data element, a respective different priority is assigned to each allocated database entity, and relaying is performed to said database entity to which is assigned the next priority in the descending order of assigned priorities;

and, if a predetermined condition is fulfilled, the priorities assigned to said database entities are changed.

Still further, according to the present invention this object is achieved by a database entity in a network environment, comprising: storage means keeping a respective record of data element information for a plurality of data elements; receiving means adapted to receive an update for a data element and to store said updated data element in said storage means; and relaying means adapted to relay the received update for a data element to another database entity.

Also, according to the present invention this object is achieved by a request routing entity in a network environment, comprising: storage means comprising a table defining an allocation of at least two of said plurality of database entities to a specific data element; receiving means adapted to receive a request for data element update; selection means adapted to select one of said database entities from said table according to the entries to said table; and forwarding means adapted to forward said data element update to said selected database entity.

In particular, both entities, i.e. the request routing entity and the database entity, are adapted to mutually cooperate with each other in order to perform the method as described above.

By virtue of the method and entities according to the present invention being implemented in a network environment such as a communication network, it is advantageously enabled that data element, i.e. subscriber information is distributed within the network, thereby providing a redundancy for these information in the network. The level of redundancy for the data element/subscriber information may be determined by the number of database entities to which said data element/subscriber information is forwarded and relayed. Still further, the method according to the present invention allows to implement a functionality, according to which a two-way replication between data element/subscriber information stored in two different database entities can be provided. In particular, the two-way replication does not cause any conflicts in database transactions. Also, since the redundancy is provided for each data element/subscriber based on clustering the database entity, changes concerning data element/subscriber data can be kept track immediately without a necessity to wait for a new backup to occur after the lapse of a backup interval. Therefore, the data element/subscriber information are always up to date in the first database entity as well as in the replicated database entity/entities providing redundancy.

Furthermore, it is to be noted that the present invention is not limited to updates from subscriber management systems. Rather, all kind of subscriber data updates in a communication network can be handled using the present invention. By virtue thereof, an improved redundancy concerning all functionalities (including subscriber management and network operations) can be achieved.

More generally, a data element as used herein may comprise, for example, the information comprising a database record or a file record, the information comprising a tuple within a relational database, the information related to a given subscriber in a communication network, the information related to an arbitrary entity in association with a communication network, the information related to an arbitrary object instance, the information related to a set of related arbitrary object instances, or the like.

BRIEF DESCRIPTION OF THE DRAWINGS

The above and other objects, features and advantages of the present invention will become more fully apparent upon referring to the following specification in conjunction with the accompanying drawings, in which.

DETAILED DESCRIPTION OF THE EMBODIMENTS

The present invention may be more readily understood upon referring to the subsequent specification in combination with the drawings.

Figure 1:
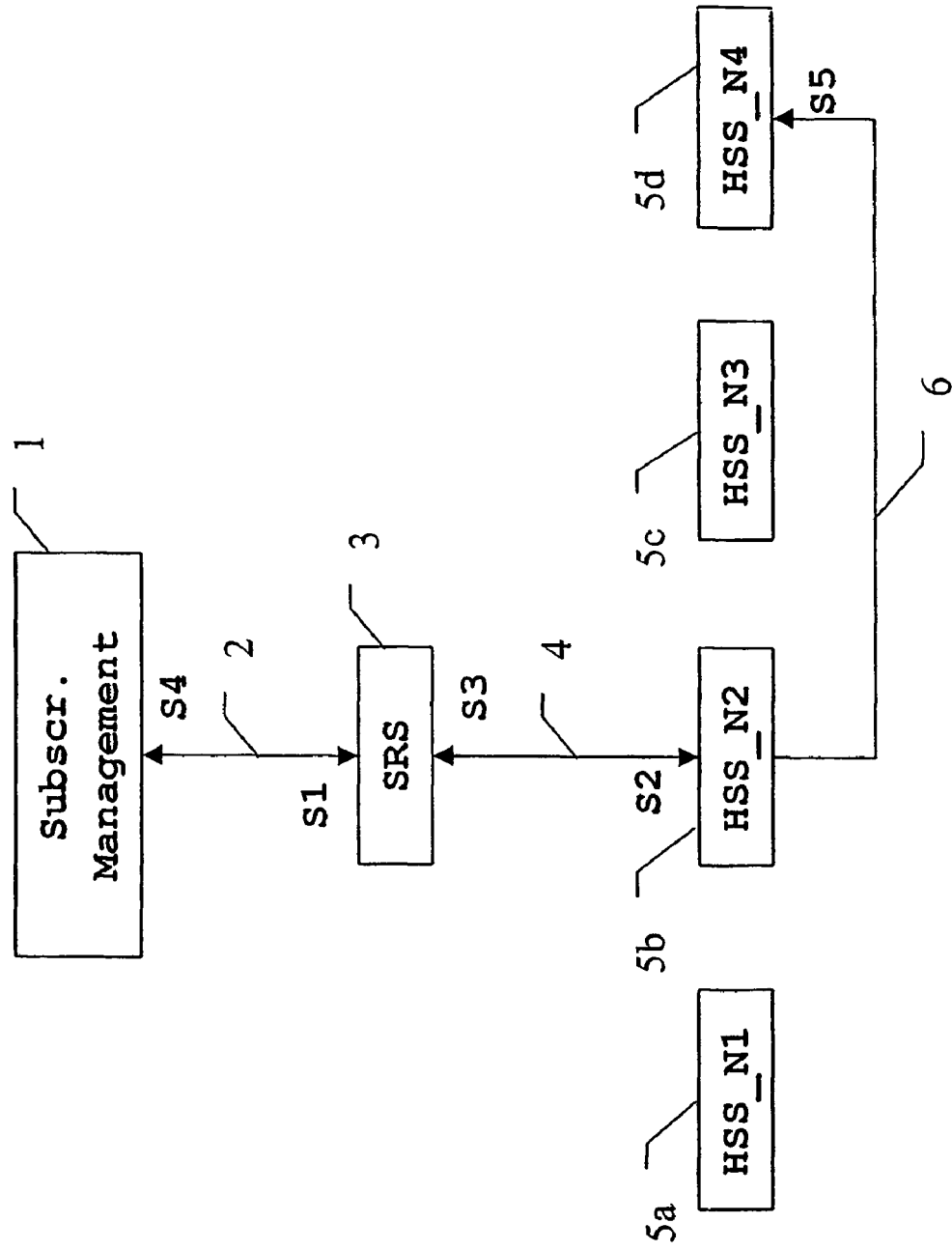
FIG. 1 shows an architecture of those parts of the communication network relevant to the present invention.

FIG. 1 shows an architecture of those parts of the communication network relevant to the present invention.

A subscriber management entity denoted by 1 is adapted to bidirectionally communicate via an interface denoted by 2 with a signaling routing entity denoted by 3. The signaling routing entity is adapted to route signals to a selected one of a plurality of database entities denoted by 5a, 5b, 5c, 5d. An interface between said signaling routing entity and a respective one of said database entities is denoted by 4. Still further, each of said database entities is adapted to relay subscriber information contained therein to at least another database entity, as indicated by the interface illustrated by an arrow denoted with numeral 6.

The subscriber management entity is run by the operator of the communication network and is responsible for creating and/or changing subscriber information concerning subscribers having subscribed to said communication network. The signaling routing entity may for example be a so-called Signaling Routing Server SRS. Such a signaling routing server which has been chosen here as an example for a signaling routing element is adapted to route signals, i.e. subscriber information, to a selected one of said plurality of database entities. The plurality of database entities 5a, 5b, 5c, and 5d are in a third generation communication network so-called home subscriber server nodes (HSS_N1, HSS_N2, HSS_N3, HSS_N4). Although these home subscriber server nodes are illustrated in FIG. 1 as being separate and distinct from each other, this is not necessarily the case. For example, the home subscriber server nodes may physically be in the same location. However, the home subscriber server nodes have to be logically distinct from each other.

In operation, the subscriber management entity 1 transmits in a first step denoted by S1 a subscriber information update for a specific subscriber, via said interface 2, to said signaling routing entity 3. The signaling routing entity 3 selects one of said plurality of database entities for said specific subscriber. This selection is based on a table kept at said signaling routing entity, which table defines an allocation of at least two of said plurality of database entities to a specific subscriber. An example for such a table will be described herein below with reference to FIG. 2. In a step S2, the signaling routing entity forwards said subscriber information update to said selected database entity, which, in the present example, is the entity denoted by 5b. Forwarding said subscriber information update is accomplished using the interface 4 between the signaling routing entity and the selected database entity. The subscriber information update comprises at least a request to update subscriber information concerning a specific subscriber as well as the subscriber information as such. The subscriber information as such comprise at least subscription related information for supporting network entities actually handling communication for a subscriber. In case of a successfully received subscriber information update, the selected database entity acknowledges the receipt via the interface 4 in a step S3 to the signaling routing entity 3. The signaling routing entity 3 in turn confirms the subscriber information update via the interface 2 in a step S4 to the subscriber management entity. Thus, upon receipt of a subscriber information update, the subscriber information of the concerned subscriber are updated in the selected database entity, 5b in the illustrated example. In order to provide for redundancy, the selected database entity 5b thereupon relays the subscriber information update to at least another database entity, 5d in the illustrated example (step S5, arrow denoted by 6). It should be noted that, in order to provide a minimum level of redundancy, at least two database entities have to be updated. In such a case, and as explained in detail hereinafter, the database receiving the subscriber information update from the signaling routing entity 3 is referred to as primary database entity, whereas the database entity to which the subscriber information update is relayed from the primary database entity is referred to as secondary database entity.

However, it is to be understood that subscriber information updates may be of course relayed to more than one database entity, thereby providing a higher level of redundancy. In this connection, it is conceivable that the primary database entity relays said subscriber information update to the secondary database entity, which in turn relays the subscriber information update to a ternary database entity, and so on. Thus, a cascaded relaying is conceivable. The time required for achieving the highest level of redundancy is then linked to the number of database entities provisioned for keeping a record of replicated and/or copied subscriber information. Therefore, in order to speed up the process of providing redundancy, it is also conceivable that the primary database entity relays the subscriber information update in a star-like manner to the secondary, the ternary and so on database entities. In such cases, the signaling routing entity will of course have to be provided with an accordingly adapted table. Also, in any such cases, a selected primary database entity is of course provided with the necessary information for relaying the subscriber information update to a secondary database entity and so on.

In order to keep the present description simple, the present description is limited to a case, where only the minimum level of redundancy is provided for, i.e., only a primary and secondary database entity are defined.

Figures 2, 3:
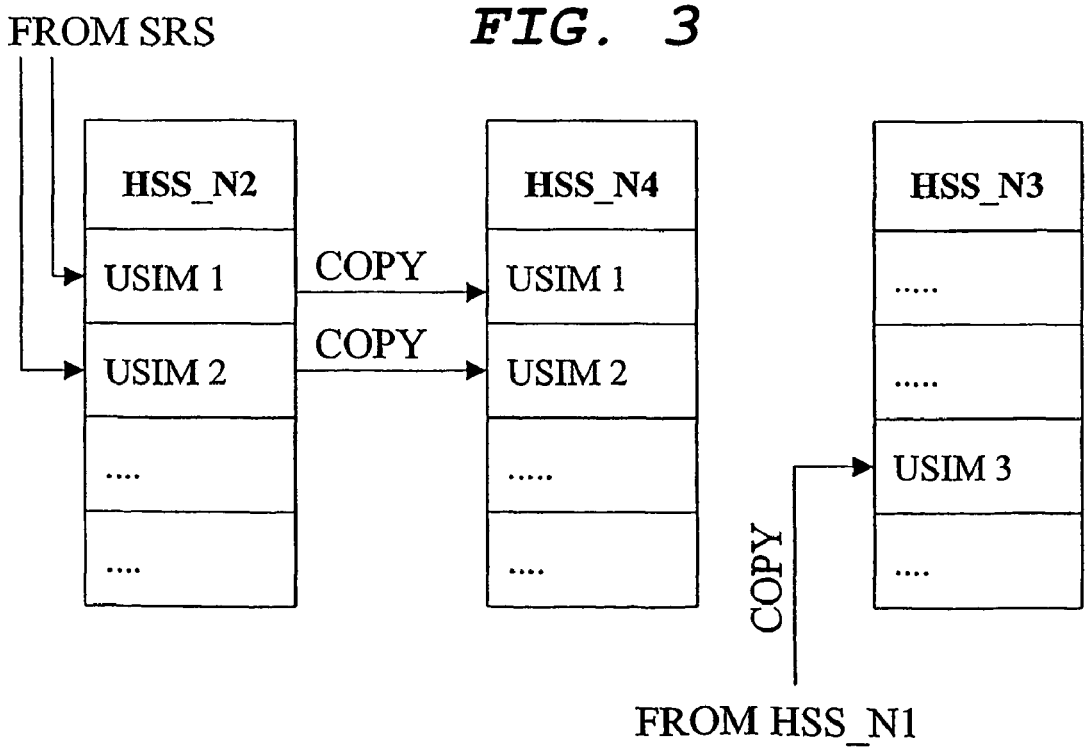
FIG. 2 shows a database allocation table at a signaling routing entity.
FIG. 3 shows an example of subscriber data being replicated from one database entity to another database entity.

FIG. 2 shows a table defining an allocation of two of said plurality of database entities to a specific subscriber. As shown in FIG. 2, a subscriber is identified for example by its USIM (UMTS SIM=UMTS Subscriber Identity Module). Thus, as shown in FIG. 2, data related to three subscribers USIM 1, USIM 2, USIM 3 are contained in the table. To each of said subscribers, two database entities are allocated: one primary database entity and a secondary database entity, i.e. a primary HSS and a secondary HSS. In the shown example, USIM 1 is allocated HSS_N2 as a primary HSS, and HSS_N4 as a secondary HSS. Likewise, USIM 2 is allocated HSS_N2 as a primary HSS, and HSS_N4 as a secondary HSS, while USIM 3 is allocated HSS_N1 as a primary HSS and HSS_N3 as a secondary HSS. USIM 1 and USIM 2 represent a subscriber cluster having a common HSS node pair. This is beneficial in order to avoid a problem with the subscriber specific routing mechanism in that a state change (to be described later) in two HSS nodes could result in a situation where part of the subscribers have both HSS node alternatives in a secondary state. The primary HSS receives the subscriber information update from the signaling routing server SRS, while the secondary HSS receives the subscriber information update as relayed information from the primary HSS, as previously explained in connection with FIG. 1.

FIG. 3 shows an example of subscriber information updates and replicated and/or duplicated data in connection with the example shown in FIG. 2. HSS_N2 is defined as a primary database entity for subscribers USIM 1 and USIM 2. Thus, HSS_N2 receives, via the SRS from the subscriber management, subscriber information (new and/or updated subscriber information) for subscribers USIM 1 and USIM 2. Together with this information, HSS_N2 receives an indication, which database entity is defined as a secondary database entity for the respective subscriber. (Note that to each primary database entity there could be fixedly assigned a secondary database etc. This would alleviate the need for transmitting the above mentioned indication, i.e. address of the secondary database. However, this would not be optimum in terms of flexibility of the system) Thus, subscriber information related to subscriber USIM 1 is copied to HSS_N4 as the secondary database entity, and subscriber information related to USIM 2 is copied from HSS_N2 to HSS_N4 as the secondary database entity for the subscriber USIM 2. Also shown in FIG. 3 is the database entity HSS_N3. As HSS_N3 has been defined as the secondary database for the subscriber identified by USIM 3, HSS_N3 receives a copy of the subscriber data related to USIM 3 from HSS_N1, defined as a primary database entity for the subscriber USIM 3.

Figure 4:
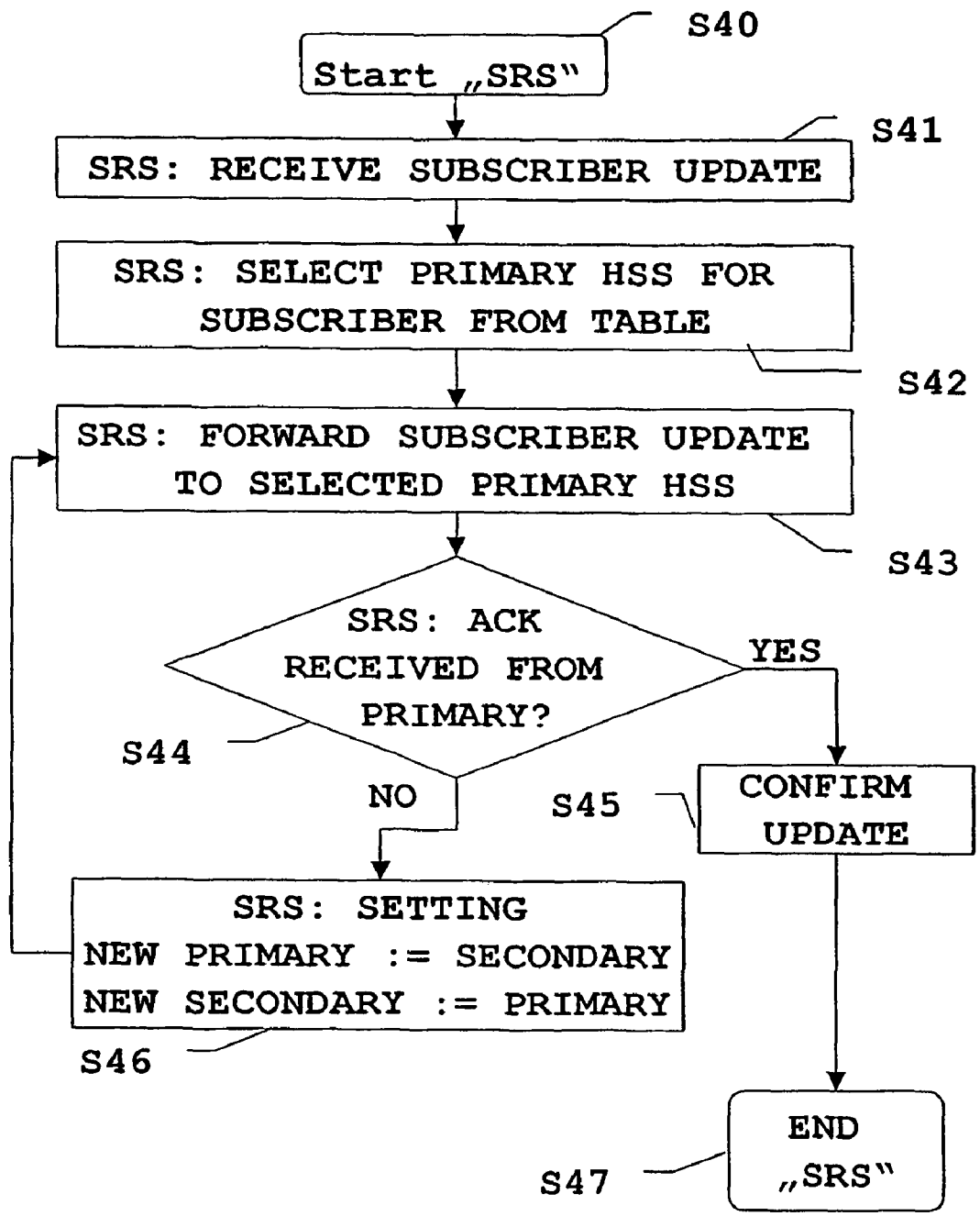
FIG. 4 shows a flowchart of method steps implemented to be carried out at the request routing entity and/or signaling routing entity.

FIG. 4 shows a flow chart illustrating method steps implemented to be carried out at the signaling routing server entity in connection with the present invention.

As shown in FIG. 4, the process carried out at the SRS starts in step S40. In a subsequent step S41, the SRS receives a subscriber update, i.e. a request to update subscriber information as well as the subscriber information to be updated. Based on the table provided for at the SRS, and as described in connection with FIG. 2, the SRS, in step S42, selects a primary database entity for the specific subscriber from said table. Thereafter, as described in connection with FIG. 3, the SRS forwards the subscriber information update to the selected primary database entity, step S43. Thereupon, in step S44, the SRS waits for receiving an acknowledgment from the primary database entity. If the acknowledgment is received, "YES" in step S44, the SRS confirms the subscriber information update to the subscriber management entity and the process carried out at the signaling routing entity SRS ends in step S47. If, however, in step S44 no acknowledgment is received from the primary HSS, "NO" in step S44, the process proceeds to step S46. In case that (for whatever reason) no acknowledgment is received, this corresponds to a predetermined condition being fulfilled, upon which predetermined condition priorities assigned to the database entities are changed. Thus, at the SRS a setting is carried out in that a new primary HSS is defined to be the (previous) secondary HSS, while a new secondary HSS is defined to be the (previous) primary HSS, to which the subscriber information update could not successfully be forwarded and/or from which no acknowledgment could be received. After changing the priorities, which, in case of only two database entities being allocated to a respective subscriber, corresponds to an exchange of the priorities assigned to the database entities, the flow returns from step S46 to step S43. This means that in step S43 the SRS forwards the subscriber information update to the selected, new primary HSS and the previously described steps S44, S45, S46, S47 are repeated. This loop may be continued until an acknowledgment from the currently selected primary database entity may be received in step S44, as illustrated in FIG. 4. Nevertheless, in a modification (not shown) the loop may be interrupted after a predetermined number of iterations.

Figure 5:
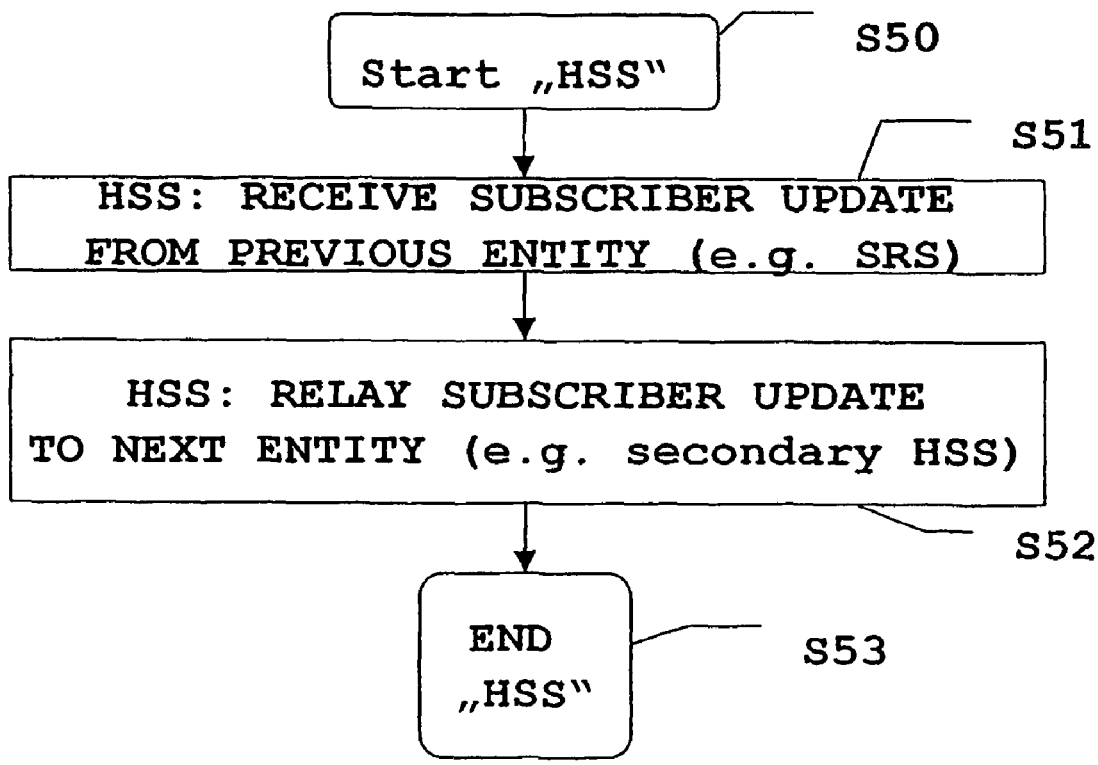
FIG. 5 shows a flowchart of steps implemented to be carried out at a respective database entity.

FIG. 5 shows a flowchart of method steps to be implemented in a database entity HSS, when realizing the present invention. In case only two database entities are allocated to a respective subscriber, i.e., a primary and a secondary database entity, the method steps illustrated in FIG. 5 are carried out in the primary database only. Nevertheless, in case of a cascaded provisioning of subscriber information redundancy, as roughly outlined herein above, each HSS is adapted to carry out the method steps described in FIG. 5, except the database entity to which is assigned the lowest priority, i.e. the one which is at the end of the cascade. (In case of the star-like redundancy provisioning, it has only to be implemented at the primary database entity.) The reason therefore is, that the database entity at the end of the cascade will not have to relay a subscriber information update any further.

Now, returning back to the flowchart of FIG. 5, the process carried out at a respective database entity HSS starts in step S50. Thereafter, the HSS concerned receives the subscriber information update from the previous entity. For example, if the HSS concerned is the primary HSS, the HSS receives the subscriber information update from the signaling routing entity SRS. Assuming a case in which still a ternary HSS is defined, then the HSS concerned could also be the secondary HSS, which in case of a cascaded arrangement, could also receive the subscriber information update from the primary HSS. This is illustrated in step S51. Thereafter, the HSS concerned relays the subscriber information update to the next entity, for example, to the secondary HSS, step S52. Thereafter, after having relayed said subscriber information update, the process ends in step S53.

In a modification (not shown), the entity such as the secondary HSS to which the subscriber information update is relayed may of course confirm the receipt of the relayed subscriber information update by an acknowledgment. Such an acknowledgment may be returned to said entity, from which the relayed subscriber information update was received, or to the signaling routing server SRS. In the first case, the entity relaying the subscriber information update would be informed of a successful relaying and could report the successful relaying itself to the signaling routing server, thereby avoiding a re-relaying without need. However, as the acknowledgment from the secondary database entity would have to pass the primary database entity before reaching the signal routing server SRS and the subscriber management entity, the feedback concerning a successful update to the subscriber management entity would be somewhat delayed. Therefore, an acknowledgment from the secondary HSS to the signaling routing server and from there to the subscriber management entity, would speed up the feedback for a successful subscriber information update to the subscriber management. Also, the secondary database entity could send an acknowledgment to both, the primary database entity (or generally to the previous entity) as well as to the signaling routing server, thereby combining the benefits of speeding up the feedback for successful subscriber information update to the subscriber management entity as well as avoiding a re-relaying of the subscriber information update from the primary HSS to the secondary HSS.

As becomes clear from the foregoing, the present invention concerns a database replication in case of an all-IP database entity such as a home subscriber server, when a signaling routing entity such as a signaling routing server SRS is used. According to the present invention, a database replication via the SRS is introduced. To this end, for each subscriber there is defined in the SRS a primary and a secondary database entity (HSS node). This information is kept in table at the SRS including an allocation of the database entities defined for each subscriber. The SRS routes the subscriber information updates for the HSS concerning a subscriber to that HSS node of the two alternatives which is in the primary state, this means that a database entity is selected according to the highest priority assigned thereto in order that the subscriber information update is forwarded thereto, and the HSS node in the primary state propagates and/or relays the subscriber information update to the secondary HSS node which is assigned the next priority in the descending order of assigned priorities. Also, if there is a state change in a HSS node from primary to secondary, the SRS starts routing the subscriber information updates, i.e. the update requests and the information to be updated, to the other HSS node. The designation of primary and secondary database entities is subscriber specific. All transactions concerning a specific subscriber are forwarded from the SRS to the primary database entity only. The primary database entity then updates also the secondary database entity in terms of the subscriber information of the specific subscriber. It is to be noted that these functionalities happen on a per subscriber basis, and not on a per database basis. If, in case of a predetermined condition being fulfilled, the secondary database entity is switched to become the primary database entity and vice versa in the SRS, then the updates are effected vice versa, but only to one direction. Accordingly, using an upper level functional element such as the SRS, having information of a primary and a secondary database entity, the system can provide update mechanisms on a per subscriber basis in two directions, while only one direction can be active at a time.

Although herein before a focus has been laid on the description of the method according to the present invention, it is to be understood and immediately evident to a skilled person that the present invention also concerns a database entity and request routing entity adapted to mutually cooperate with each other in order to perform the method according to the present invention.

In this connection, a database entity 5a to 5c according to the present invention in a network environment comprises storage means adapted to keep a respective record of data element information for a plurality of data elements USIM1, USIM2, USIM3; receiving means adapted to receive an update for a data element USIM1, USIM2 and to store said updated data element in said storage means; and relaying means adapted to relay the received update for a data element USIM1, USIM2 to another database entity 5d.

A request routing entity 3 in a network environment, in turn, comprises: storage means comprising a table defining an allocation of at least two of said plurality of database entities to a specific data element; receiving means adapted to receive a request for data element update; selection means adapted to select one of said database entities from said table according to the entries to said table; and forwarding means adapted to forward said data element update to said selected database entity.

Accordingly, as has been described herein above in detail, the present invention proposes a method for data element information management in a network environment, the network environment comprising a plurality of data element information database entities 5a, 5b, 5c, 5d, each keeping a respective record of data element information for a plurality of data elements, and a request routing entity 3, adapted to route 4, S2 requests to a selected one of said plurality of database entities, the method comprising the steps of transmitting S1 a data element information update for a specific data element to said request routing entity 3, selecting, at said request routing entity 3, one 5b of said plurality of database entities for said specific data element, forwarding S2 said data element information update to said selected database entity 5b, and relaying S5 said data element information update from said selected database entity 5a to another database entity 5d of said plurality of database entities. Also, the present invention concerns a request routing entity and a database entity, adapted to mutually cooperate with each other in order to perform the method according to the present invention.

Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. A method, comprising:
    receiving, at a server of a network environment, a data element information update for a specific data element, said server comprising a table defining an allocation of at least three of a plurality of database entities to said specific data element, each of said plurality of database entities configured to keep data element information for a plurality of data elements, wherein a respective different priority is assigned to each allocated database entity;
    selecting, at said server, one of said at least three database entities for said specific data element based on the assigned priority;
    said server determining, using at least the table, information for relaying the data element information update to at least a second, next highest priority database entity of said at least three database entities and a third database entity of lower priority than said second database entity, said third database entity of said at least three database entities;
    said server forwarding said data element information update and said determined information to said selected database entity;
    said selected database entity, using at least said determined information, forwarding said data element information update and providing at least a portion of said determined information to said second, next highest priority database entity; and
    said second, next highest priority database entity, using at least said portion of said determined information, forwarding said data element information update to a third database entity of lower priority than said second database entity.

2. The method according to claim 1, wherein said data element information comprises information related to a subscriber of a communication network.

3. The method according to claim 1, further comprising acknowledging the data element information update by said selected database entity to said server,
    wherein in case the selected database entity does not acknowledge the data element information update, the priorities assigned to said database entities in said table at the server are changed.

4. A system, comprising:
    a plurality of database entities, each of said plurality of database entities configured to keep data element information for a plurality of data elements, wherein a respective different priority is assigned to each allocated database entity; and
    a server configured to receive a data element information update for a specific data element, said server comprising a table defining an allocation of at least three of said plurality of database entities to said specific data element, wherein said server is configured to determine, using at least the table, information for relaying the data element information update to at least a second, next highest priority database entity and a third database entity of lower priority than said second database entity;
    wherein said server comprises a selector configured to select one of said at least three database entities for said specific data element based on the assigned priority,
    wherein said server comprises a forwarder configured to forward said data element information update and said determined information to said selected database entity;
    wherein each of said database entities is further configured such that said data element information update is forwarded to another database entity assigned a next highest priority relative to the database entity, where said selected database entity forwards said data element information update and at least a portion of the determined information to a second, next highest priority database entity of said at least three database entities, wherein said second, next highest priority database entity, using at least said portion of said determined information, forwards said data element information update to a third database entity of lower priority than said second database entity, said third database entity being one of said at least three database entities.

5. The system according to claim 4, wherein said data element information comprises information related to a subscriber of a communication network.

* * * * *